United States Patent [19]

Kolossow

[11] Patent Number: 4,615,664
[45] Date of Patent: Oct. 7, 1986

[54] APPARATUS FOR PRODUCING EXPANDED THERMOPLASTIC MATERIALS

[75] Inventor: Klaus-Dieter Kolossow, Hambüren, Fed. Rep. of Germany

[73] Assignee: Hermann Berstorff Maschinenbau GmbH, Fed. Rep. of Germany

[21] Appl. No.: 652,491

[22] Filed: Sep. 20, 1984

[30] Foreign Application Priority Data

Oct. 5, 1983 [DE] Fed. Rep. of Germany ....... 3336179

[51] Int. Cl.$^4$ ................................................ B29B 7/18
[52] U.S. Cl. ..................................... 425/4 C; 264/50; 366/78; 366/293; 425/205; 425/378 R; 425/199
[58] Field of Search .................................... 425/197–199, 425/204, 205, 207–209, 817 C, 4 C, 378 R, 379 R; 366/78, 83, 86, 87, 293, 294; 264/50, 51, DIG. 5, DIG. 13, 45.9

[56] References Cited

U.S. PATENT DOCUMENTS

| | | | |
|---|---|---|---|
| 3,112,525 | 12/1963 | Moziek | 425/185 |
| 3,374,300 | 3/1968 | Azuma | 425/4 C |
| 3,702,691 | 11/1972 | Fritsch | 366/86 |
| 3,782,700 | 1/1974 | Wittrock | 366/83 |
| 3,827,841 | 8/1974 | Kawai et al. | 264/51 |
| 3,924,835 | 12/1975 | Hohnfeld et al. | 366/293 |
| 4,395,212 | 7/1983 | Lambertus | 425/198 |
| 4,410,477 | 10/1983 | Claude | 425/185 |
| 4,416,543 | 11/1983 | Brinkmann | 366/83 |
| 4,431,311 | 2/1984 | Kolossow | 264/45.9 |
| 4,511,320 | 4/1985 | Lambertus | 425/199 |

FOREIGN PATENT DOCUMENTS

| | | | |
|---|---|---|---|
| 1135652 | 11/1953 | Fed. Rep. of Germany . | |
| 413474 | 4/1946 | Italy | 425/198 |
| 56-60234 | 5/1981 | Japan | 425/4 C |

Primary Examiner—Jay H. Woo
Assistant Examiner—J. Fortenberry
Attorney, Agent, or Firm—Schwartz, Jeffery, Schwaab, Mack, Blumenthal & Evans

[57] ABSTRACT

An apparatus is disclosed for optimizing a method of producing a foam or expanded thermoplastic material, the material usually being mixed with a propellant. The apparatus comprises a filter unit which is disposed between and connects, a fusing and homogenizing extrusion device and a dynamic cooling device. The material is fed into the apparatus at one end of the extrusion device and passes sequentially through the extrusion device, the filter unit and the cooling device. Separate drive means are provided for the fusing and homogenizing extrusion device and the cooling device respectively. Both the extrusion device and the cooling device are disposed on a common longitudinal axis. The connections of the two devices to the filter unit is effected by means of flange mountings. The filter units also includes interchangeable filters which are traversed by the material. In the filter unit, the material flows through a conduit which flares conically outwardly from the filter to the inlet of the cooling device. The extrusion device is so mounted as to permit longitudinal axial thermal expansion and contraction to occur and to permit the extrusion device to be moved away from the cooling device for cleaning purposes.

10 Claims, 5 Drawing Figures

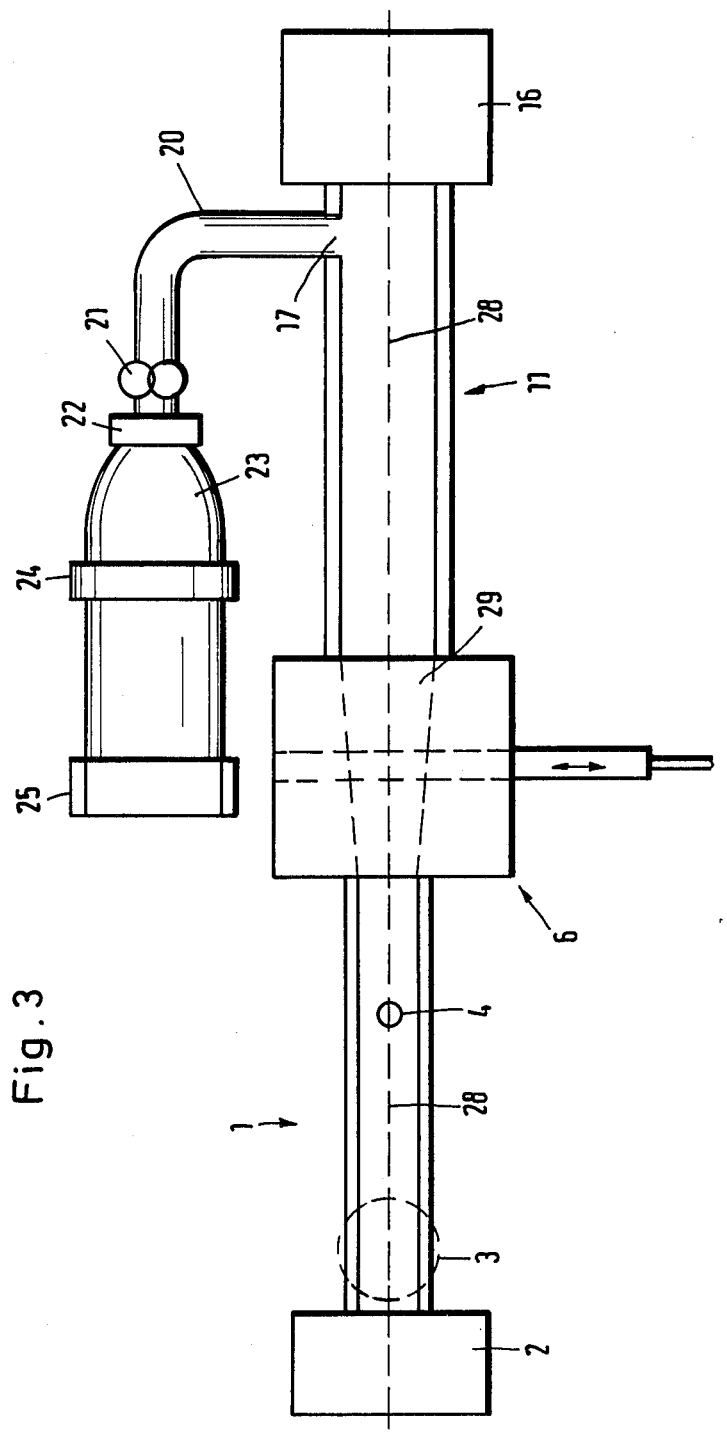

APPARATUS FOR PRODUCING EXPANDED THERMOPLASTIC MATERIALS

FIELD OF THE INVENTION

The present invention relates to an apparatus for producing foamed or expanded thermoplastics materials. Typical of such materials are polystyrene and polyethylene.

BACKGROUND OF THE INVENTION AND DISCUSSION OF PRIOR ART

An apparatus for producing foamed or expanded thermoplastics materials is disclosed in German Patentschrift No. 1 135 652. Such apparatus comprises a fusing and homogenising extrusion device connected in series with a cooling device. The thermoplastics material, which has previously been mixed with a propellant, is treated in the fusing and homogenising extrusion device and is then conveyed into a static cooling device through a long conduit.

Because of the conveying pressure of the fusing and homogenising extrusion device, the material to be cooled must be extruded through the conduit, which latter has a relatively small diameter, and through the cooling unit. In addition, a tool such as a blow head is usually provided at the outlet end of the cooling unit. This tool sets up a back pressure which must also be overcome if the material is to continue its travel through the apparatus.

The homogenised material, which has been mixed with propellant, therefore needs to be subjected to a high pressure to enable it to progress. This, however, has the disadvantage of causing energy to be released which causes the thermoplastic material to become heated. In consequence, most of the cooling power of the cooling device, which is located at the downstream end of the apparatus is needed to remove the heat introduced into the material by friction. Accordingly, the intended purpose of the cooling device, which is to cool the mixture of material and propellant to a temperature below the decomposition temperature of the propellant, is not adequately achieved. Moreover, such cooling is particularly uneconomical.

Any changes in the direction of flow of the mixture of material and propellant also causes a certain amount of frictional heat to be introduced into the mixture. Such heat must be removed before the mixture emerges from the extrusion tool. This can only be achieved with great difficulty and by utilising further, more powerful, cooling devices.

OBJECTS OF THE PRESENT INVENTION

The present invention seeks to provide an apparatus which is accurately adaptable to an optimum method of producing an expanded mixture of material and propellant and for producing the expanded product. The present invention also seeks to provide an apparatus in which optimum control of the temperature in the cooling device can be achieved with a minimum energy expenditure.

Furthermore, the present invention seeks to provide an apparatus which is easy to clean and to assemble and in which the flow stream of the plastics material and propellant mixture is subjected to a filtering action which removes foreign particles but without the resultant introduction of frictional energy into the mixture having a detrimental effect on the operation of the apparatus.

SUMMARY OF THE INVENTION

According to the present invention there is provided an apparatus for producing foamed or expanded thermoplastic materials such as polystyrene or polyethylene comprising a fusing and homogenising extrusion device and a dynamic cooling device which are traversed sequentially by the material being treated, the fusing and homogenising extrusion device and the dynamic cooling apparatus each having a separate drive means associated therewith and being disposed on a common longitudinal axis; the outlet end of the fusing and homogenising extrusion device and the inlet end of the cooling device each being flange-mounted on a filter unit including interchangeable filters disposed therebetween, the filter unit defining a conduit for the passage of the material being treated therethrough, the conduit flaring conically outwardly downstream of the filter in a direction towards the cooling device, the fusing and homogenising extrusion device being so mounted as to permit, in use, longitudinal axial thermal expansion and contraction to occur and to permit displacement of the extrusion device away from the cooling device for cleaning purposes.

By disposing the fusing and homogenising extrusion device and the cooling device on a common longitudinal axis, a deflection of the material mixture, which would cause frictional heat to be produced, is prevented.

Optimum treatment of the material and control of the temperature of the mixture of material and propellant is ensured by the provision of two separate drive units, one for the extrusion device and one for the cooling device. Each drive unit may be operated at different speeds and are variably adjustable.

To achieve satisfactory homogenization and fusing of the material itself and to achieve uniform distribution of the propellant in the fused material, it is necessary for the speed of the drive means utilised in the fusion and homogenisation device to be variable independently of the speed of the drive means in the cooling device. This is because the necessarily relatively high speed of the screw in the extrusion device would have an extremely detrimental effect in the cooling device.

Since the fusing and homogenising extrusion device is operated at a relatively high temperature of, for example, between 180° and 220° C. and the cooling device is operated at temperatures of between 180° C. and 40° C., considerable thermal expansion and contraction occurs. To permit such thermal expansions or stresses to be overcome, the extrusion device is displaceably mounted with respect to the cooling device. This simultaneously provides the advantage that the extrusion device, the filter unit and the cooling unit can be rapidly dismantled, cleaned and re-assembled. In particular, the provision of the filter unit between the extrusion device and the cooling unit makes it possible to achieve an optimum method of producing a mixture of material and propellant.

During the course of the method, the mixture of material and propellant is subjected to a filtering process at a location where a detrimental effect on the temperature, a pressure and introduction of frictional heat is of little or no importance. This is because the mixture, at such location, is unaffected by such influences.

It has, hitherto, been common practice for the mixture to be passed through a filter changing apparatus at the downstream end of the cooling device. However, filtering at such a location is disadvantageous because it causes a back-pressure to be built up in the cooling device. This raises the temperature of the mixture in the cooling device and, in turn, this necessitates the use of considerably more powerful cooling devices. It will be readily apparent that the reason for this is that plastics materials are very poor thermal conductors.

Every filter apparatus does, however, produce a certain amount of back-pressure and, as a consequence thereof, a certain increase in the temperature. Accordingly, in the present invention, the conduit through which the material flows between the extrusion device and the cooling device flares conically outwardly from the downstream end of the extrusion device to the inlet end of the cooling device. The filter unit is disposed in this conduit. Accordingly, because the area of the filter is greater than the cross-sectional area of the extrusion device, the tendency for the temperature to rise is negated.

Advantageously, the dynamic cooling device is provided with a conveyor screw, or other conveying elements disposed on a core and is provided with its own drive means so that it can be operated to produce the desired temperature of the mixture of material and propellant in the cooling device. In practice, this generally means a considerably lower speed is set for the dynamic conveying means.

In order to achieve a simple and operationally satisfactory mounting arrangement for all the assemblies, that is to say, for the separate drive units of the extrusion device and the cooling device, a particular mounting arrangement is preferred. In such preferred arrangement, the drive unit for the fusing and homogenising extrusion device is disposed at the upstream (in the direction of material flow) end of the extrusion device and the drive unit for the cooling apparatus is disposed at the downstream (in the direction of material flow) end of the cooling device, the extrusion device, the cooling device and both drive units all being disposed on the common longitudinal axis.

Desirably, the flanges producing the flange-mounting connections between the filter unit and the extrusion device and the cooling device respectively are disposed on the filter unit, said flanges being capable of absorbing thermal stresses. Such measures permit slight thermal expansion to be absorbed by the flanges. If greater thermal expansion occurs, the extrusion device together with the drive unit, is displaced along the common axis through a short distance away from the cooling device. This permits compensation for such expansion to be achieved without causing damage to the apparatus.

In some cases, it is preferred if the fusing and homogenising extrusion device is in the form of a twin-screw extrusion device. This produces forced conveyance and automatic cleaning of the extrusion device. The fusing and homogenising extrusion device may, however, also be in the form of a planetary-type roller extrusion device, particularly if highly viscous thermoplastics materials, for example polyvinyl chloride are being foamed or expanded. Planetary-type roller extrusion devices provide a very gentle homogenising action, that is to say, an action which introduces little shearing energy into the material. In such a case, however, discharge means which conveys the material from the downstream end of the planetary-type roller extrusion device into the filter unit is necessary.

If the extrusion device has a predetermined throughput rate, the amount of material extruded needs to be conveyed at a slower speed through the cooling device to produce adequate cooling. It is therefore preferable if the internal diameter of the cooling device is made larger than the internal diameter of the extrusion device. In most, if not all, cases, the extrusion and cooling devices both comprise hollow cylinders and it is the internal diameters of such cylinders which are of such sizes.

In this manner, the fusing and homogenising process may be effected at a high speed which provides optimum conditions for such treatment in that an extremely uniform and fine distribution of the propellant in the material is achieved. However, such high speed obviously produces a high delivery output. It is, on the other hand, necessary, for the mixture to dwell for a relatively long time in the cooling apparatus, so that the cooling process may be economically effected.

It is advantageous, therefore, if the internal diameter of the cylinder in the cooling device is considerably larger (up to 100% larger) than the diameter of the cylinder in the fusing and homogenising device. This provision enables the mixture to remain in the cooling device for a length of time which is up to double the time if the diameters were identical whilst still retaining same throughput capacity of the system. In this case, the output of the conveyor element in the cooling device also has to be controlled so as to be approximately half, or slightly more than half, that of the conveyor element in the extrusion device in order to prevent frictional energy being introduced into the mixture. Since the cooling device has its own, separate, stepless drive member, it is easy to adapt the speed of the conveyor element to such conditions.

Optimum cooling of the mixture of material and propellant in the cooling device may be achieved by conducting the coolant through the barrel and the screw in a direction opposite to the direction in which the mixture is being conveyed. The highest degree of cooling occurs in the initial regions of the cooling bores, that is to say at the downstream (in the direction of mixture flow) end of the cooling device. In consequence, it is possible to control the temperature at which the mixture emerges from the cooling device very accurately.

This is important, because, if the degree of foaming or expansion and the surface of the expanded film are to be controlled accurately, the temperature of the material at the outlet of the apparatus that is to say, in the blow head, must be controlled as accurately as possible.

Desirably, an annular die, tool nozzle is connected to the outlet end of the cooling device.

A further advantageous arrangement of an apparatus according to the present invention is provided if a geared pump is disposed between the outlet opening provided in the cooling device and the tool being used, which is often a blow head. A geared pump permits the mixture to be constantly conveyed, that is to say, there is always a uniform pressure acting on the material. This, in turn causes the material to be discharged from the blow head completely uniformly.

In particular, however, a geared pump provides the great advantage that it overcomes any back-pressure which may build up in the apparatus and disposes of any accumulation of the mixture upstream of the tool if a small amount of external energy is introduced into the mixture. Such energy would, otherwise, cause the temperature of the mixture to increase or would necessitate more powerful cooling to ensure that the mixture has its optimum temperature as it emerges from the tool.

BRIEF DESCRIPTION OF THE DRAWINGS

Two embodiments of the invention will be further described, by way of example, with reference to the accompanying drawings, in which:

FIG. 3 is a schematic plan view of a second embodiment of an apparatus in accordance with the present invention;

DESCRIPTION OF PREFERRED EMBODIMENTS

Figure 2:
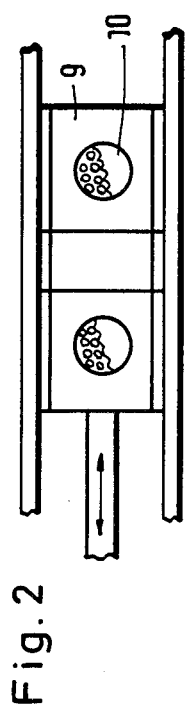
FIG. 2 illustrates a filter holder and filters forming part of the apparatus shown in FIG. 1.
Figure 1:
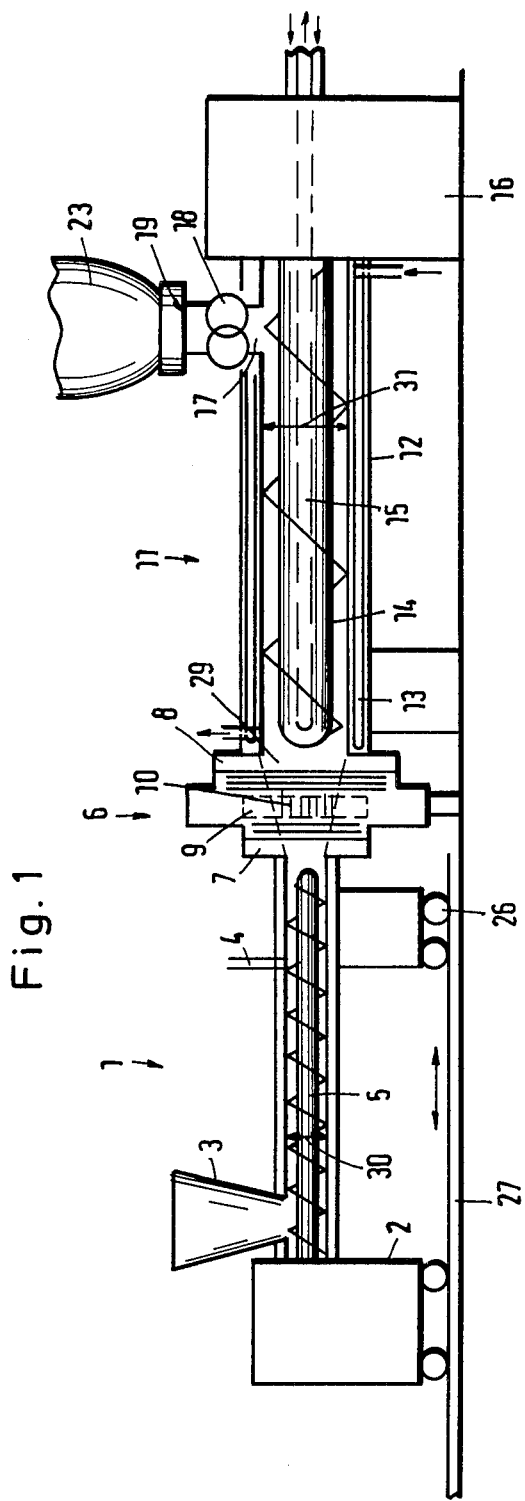
FIG. 1 is a schematic longitudinal sectional view through a first embodiment of an apparatus in accordance with the present invention for producing foamed or expanded thermoplastics materials.

As shown in the drawings, an apparatus in accordance with the present invention for producing foamed or expanded thermoplastics materials comprises fusing and homogenising extrusion device 1. The device 1 is provided with a drive unit 2, a feed hopper 3 for introducing thermoplastics material into the device 1, an injection conduit 4 for introducing a propellant into the device 1 and a screw conveyor 5. Downstream, in the direction of travel of the material through the apparatus, of the fusing and homogenising device 1, a cooling device 11 is provided.

The extrusion device 1 is connected to the cooling device 11 by means of a filter unit generally referenced 6. This unit 6 comprises an extrusion device flange 7, a filter holder 9, filters 10 and a cooling device flange 8. The extrusion device 1 and the cooling device 11 are disposed on a common longitudinal axis 28.

The cooling device 11 comprises a hollow barrel 12 provided with tempering bores 13, a screw conveyor 14 located within the barrel 12 and having tempering bores 15 formed therein, a stepless, adjustable drive unit 16 and an outlet opening 17 which connects with a geared pump 18. The geared pump 18 conveys the material into a blow head 19.

FIG. 3 is a plan view of a slightly modified embodiment of the apparatus, the modification comprising the provision of a short deflection conduit 20 disposed at the outlet opening 17. The conduit 20 leads into a geared pump 21. The geared pump then conveys the mixture into the blow head 22, from which the mixture emerges in an expanded state in the form of a bubble 23. This bubble is flattened between a pair of rollers 24 and then wound onto a winding sleeve 25.

The operation of the above-described apparatus will now be described. A thermoplastics material such as polystyrene is poured, in granular form, into the feed hopper 3 and a propellant such as a hydrocarbon is fed into the fusing and homogenising device 1 through the conduit 4.

The mixture is fused and homogenised in the extrusion device 1 and then passes into the filter unit 6 so that any impurities present may be removed. The extrusion flange 7 has thermal stress compensators which absorb thermal stresses. If the thermal expansion exceeds a predetermined level, the extrusion device 1, together with the drive unit 2, is displaced slightly away from the cooling device 11. This is achieved by mounting both the device 1 and the drive unit 2 on wheels 26 which run on rails 27.

The filter holder 9 holds two filters 10, only one of which is in use at any particular time. The holder 9 is displaceable in a direction perpendicular to the direction of flow of material through the apparatus with respect to the other components of the unit 6. It will therefore readily be seen that such displacement causes one of the filters 10 to be traversed by the mixture of material and propellant, whilst the other filter is not in use and can be cleaned or replaced. It is therefore possible to change the filters without interrupting production.

After the mixture has passed through the filter unit 6, more particularly the filter 10, it passes into the cooling device 11 through a conduit 29. The conduit 29 is outwardly conically flared in the direction of the travel of the material until it has the same diameter as the barrel 12.

Similarly, the inlet portions of the conduit 29, which is, in practice, the discharge end of the fusing and homogenising device 1 is also outwardly conically flared in the direction of travel of the material so that the fused mass passes into the cooling device 11 in an unhindered manner.

In the cooling apparatus, the material is intensively cooled by the conveyor screw 14, which is itself cooled in a counterflow manner by coolant flowing through the bores 13, and by the cylinder 12. The material is conveyed to the outlet opening 17. The speed of the screw 14, which causes such conveyance, is set by means of the drive unit 16.

Geared pump 18 is also set to the delivery output of the cooling device 11 and also discharges the mixture of material and propellant from the blow head 19.

As illustrated in FIG. 3, the expanded, tubular web of material 23 is flattened in the roller gap between the two superposed rollers 24 and is then wound onto a winding sleeve 25.

Figure 4:
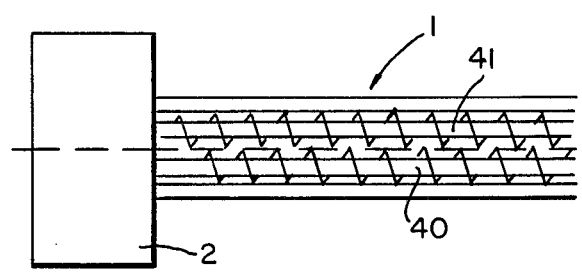
FIG. 4 is a schematic fragmentary plan view similar to a portion of FIG. 3, showing a modified twin-screw extrusion device.
Figure 5:
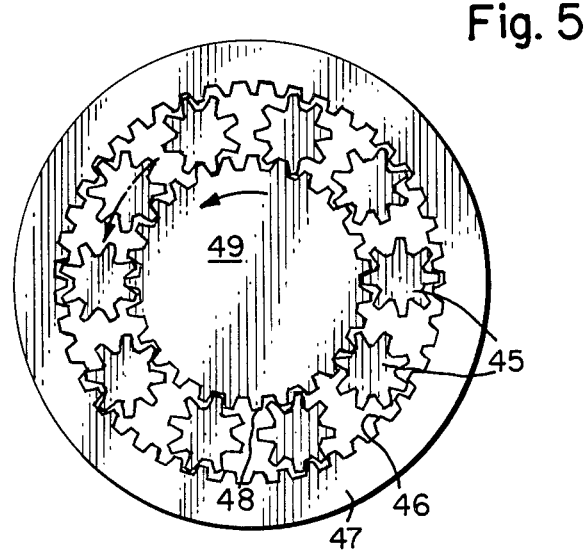
FIG. 5 is a schematic view of a modified planetary-type roller extrusion device.

As above described, the extrusion device may be in the form a twin-screw or a planetary-type roller arrangement. These alternative forms are shown in FIGS. 4 and 5. FIG. 4 is similar to the left portion of FIG. 3, except that drive unit 2 operates twin screws 40 and 41. The operation of the FIG. 4 embodiment is otherwise identical to FIG. 3. In FIG. 5, planetary roll gears commonly designated at 45 engage respectively the toothed internal surface 46 of the cylinder 47 and the teeth 48 of shaft 49. The drive arrangements of FIGS. 4 and 5 are conventional.

I claim:

1. An apparatus for producing foamed or expanded thermoplastics materials comprising:
    (a) a fusing and homogenising extrusion device comprising a barrel having opposed first and second end regions, material feed means associated with said first end region, means for admitting propellant to said barrel, conveyor means for transporting said material through said barrel from said first end region to said second end region, said second end region forming an outlet end region of said extrusion device, and drive means for driving said conveyor means;

(b) filter unit means connected by flange mountings to and communicating with said outlet end of said extrusion device, said filter unit means including interchangeable filter means, said filter unit means defining a conduit for the passage of said material therethrough, said conduit being conically flared outwardly away from said extrusion device and permitting said material to traverse said filter means;

(c) dynamic cooling means connected by mounting flanges to and communicating with the downstream end of said filter unit means, said cooling means comprising a barrel having opposed first and second end regions, the internal diameter of said barrel of said cooling means being larger than the internal diameter of the barrel of said extrusion device so as to permit a longer dwell time for the material in said cooling means to efficiently effect the cooling of the material, said first end region of said cooling means receiving material which has traversed said filter unit means, conveyor means disposed within said barrel for transporting said material from said first end region to said second end region of said cooling means, and separate drive means for driving said conveyor means in said cooling means;

(d) said extrusion device, said filter unit means, and said cooling means being disposed on a common longitudinal axis and being successively traversed by said material, and (e) mounting means for said extrusion device, said mounting means permitting longitudinal axial thermal expansion and contraction to occur and permitting longitudinal axial displacement of said extrusion device away from said cooling means for cleaning purposes.

2. An apparatus as recited in claim 1, wherein said conveyor means forming part of said cooling means comprises rotatable screw means disposed within said barrel.

3. An apparatus as recited in claim 1, wherein said conveyor means forming part of said cooling means comprises core means and conveying elements disposed around said core means.

4. An apparatus as recited in claim 1, wherein said drive means for said extrusion device is disposed adjacent said first end region of said extrusion device, and said separate drive means for said cooling means is disposed adjacent said second end region of said cooling means, said extrusion device, said cooling means and both said drive means being disposed on said common longitudinal axis.

5. An apparatus as recited in claim 1, wherein said flange-mounting connections between said filter unit means and said extrusion device, and said cooling means comprise flange means disposed on said filter unit means, said flange means being capable of absorbing thermal stresses.

6. An apparatus as recited in claim 1, wherein said conveying means in said extrusion device comprises a twin-screw arrangement.

7. An apparatus as recited in claim 1, wherein said conveying means in said extrusion device comprises a planetary-type roller extrusion device.

8. An apparatus as recited in claim 2, wherein said barrel of said cooling means defines at least one cooling conduit and said screw in said barrel of said cooling means also defines at least one cooling conduit, each said cooling conduit extending in a direction generally from said second to said first end of said barrel, coolant means being caused to flow through said conduits in such direction.

9. An apparatus as recited in claim 1 additionally comprising annular die means connected to and communicating with said second end of said barrel of said cooling means.

10. An apparatus as recited in claim 9 additionally comprising geared pump means disposed between said second end of said barrel of said cooling means and said die means.

* * * * *